May 22, 1928.

F. VOLARE 1,670,915

BEARING

Filed May 26, 1927

INVENTOR
Fred Volare
BY
ATTORNEY

Patented May 22, 1928.

1,670,915

UNITED STATES PATENT OFFICE.

FRED VOLARE, OF SCOTCH PLAINS, NEW JERSEY, ASSIGNOR TO THE AEOLIAN COMPANY, A CORPORATION OF CONNECTICUT.

BEARING.

Application filed May 26, 1927. Serial No. 194,387.

My present invention relates to improvements in bearings, more particularly bearings between parts made of wood or equivalent materials subject to swell and shrink due to changes in atmospheric conditions, or between any parts where the bearing is bushed with a material such as felt or other soft material subject to swell and shrink by atmospheric conditions. A very important use for my invention is in connection with the bearings for the movable parts of the hammer actions of pianos; and I have chosen same to illustrate my invention in the annexed drawings.

Figure 1:
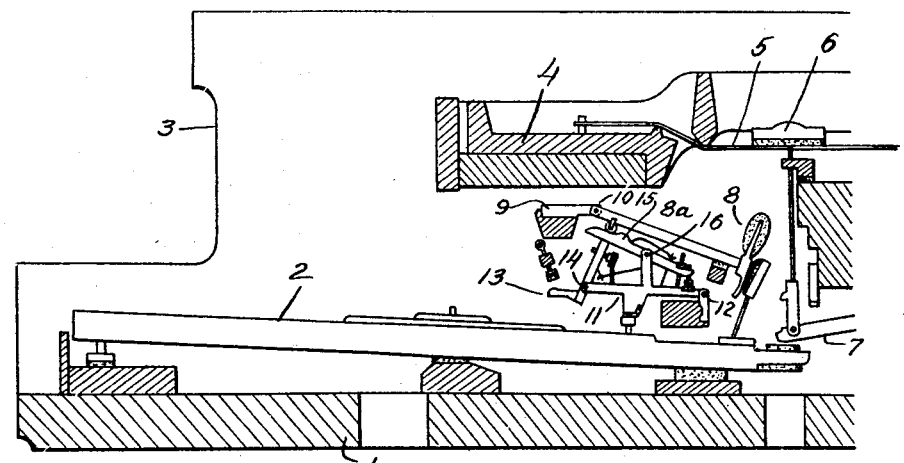
Figure 2:
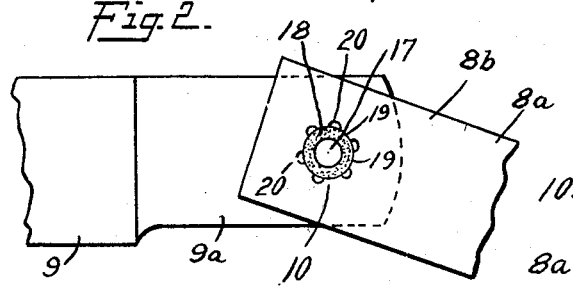
Figure 4:
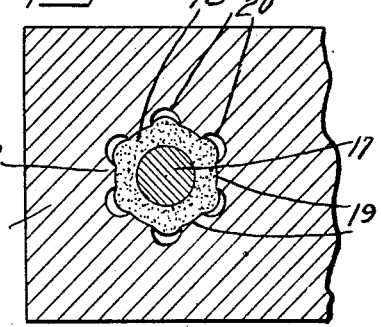
Figure 3:
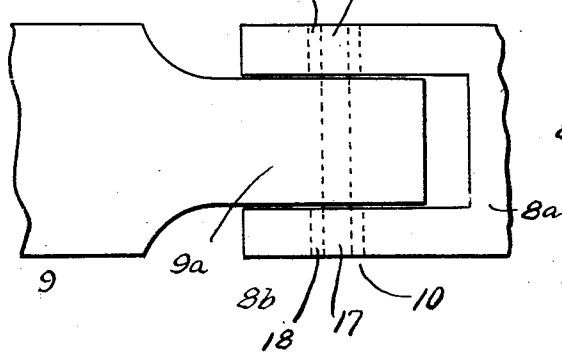

Thus, Fig. 1 is a vertical fore and aft section of the front portion of a grand piano showing one of the keys and hammer actions in side elevation to indicate the pivotal points to which my improved bearing is applicable with advantage. The remaining figures are fragmentary views on a larger scale of two of the piano action parts, namely, the hammer shank and its support of Fig. 1 designated by the same numerals as in Fig. 1, said remaining figures showing my improved bearing for the pivotal connection between the parts. With this understanding, Fig. 2 is a side elevational view of the parts shown in Fig. 3 pivotally connected by my bearing; Fig. 3 is a plan view of the forked end of the piano hammer shank connected by my bearing to the tongue of the stationary part for pivotally supporting the hammer; Fig. 4 shows the bearing of Fig. 2 on a still larger scale to illustrate how the expansion recesses permit the felt bushing to expand into said recesses in humid weather etc.; and Fig. 5 shows a modification in the respect that a different form of expansion recess is shown.

The piano construction shown in Fig. 1 is any usual construction and it will suffice to point out the main parts, as follows: Keybed 1, key 2, side of piano-case 3, wrest plank 4, piano string 5, damper 6, damper lift 7, hammer 8, hammer shank 8$^a$, hammer support 9, pivotal connection 10, between the last two parts; wippen 11, pivot for wippen 12, jack fly 13, pivot 14 between wippen and jack fly, repeating lever 15, pivot 16 between wippen and repeating lever.

The aforesaid numerals 10, 12, 14 and 16 designate the places in Fig. 1 in which my improved bearing is usable with advantage.

Figure 5:
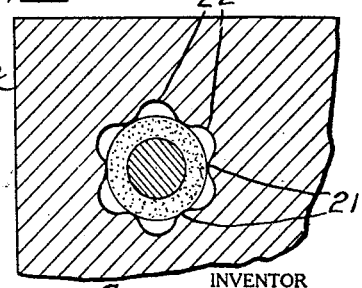

Since all of these bearings have the same construction, I have illustrated only bearing 10 in Figs. 2 to 4 inclusive, and a modification thereof in Fig. 5.

The bearing 10 comprises a metal pin 17 having tight or driven fit with a hole extending laterally through the tongue portion of the part 9, both ends of said pin projecting beyond the sides of the tongue to form trunnions. These trunnions are surrounded by bushings 18 of soft material such as felt, said bushings being respectively located and retained stationarily in holes provided to receive them in the wooden arms 8$^b$ of the forked end of the wooden hammer shank 8$^a$. Thus, the hammer shank is pivoted to the tongue 9$^a$ of the supporting part 9, the bushings 18 turning about the trunnions 17.

The wall of each hole comprises a rib or ribs 19 integral with the part 8$^a$ extending preferably lengthwise of the hole with a recess or recesses 20 adjacent or between said ribs. These bushings normally fill the holes up to the ribs 19 but not the recesses 20 so that when dampness or humidity affects the piano action parts and the bushings, the latter can swell or expand into the aforesaid recesses 20 as indicated diagrammatically in Fig. 4. In the absence of these recesses, as in the usual piano hammer action as constructed for years past, the bushings must expand inwardly, thereby considerably increasing the friction between the trunnions and the bushings and tending to make the parts of the action stick or work hard and sluggishly. As distinguished from this, the bearings of my present invention work freely and easily at all times regardless of humidity because the recess or recesses 20 permit the bushings to expand outwardly into said recess or recesses, thereby preventing the trunnions from being squeezed or gripped.

In Fig. 4, the ribs 19 are relatively wide whereas in the modification, Fig. 5, the ribs 21 are relatively narrow, so that the expansion spaces 22 being wider, the bushings can even more easily expand into said spaces.

Piano actions equipped with the bearings of the present invention work freely at all times regardless of weather and humidity. Similarly, this bearing should be used in other devices or mechanism where felt or equivalent bushed bearings are used between pivoted parts.

It is possible that modifications may be made in the foregoing preferred specific embodiments of my invention which will nevertheless still embody the spirit of my invention and come within the terms and spirit of the annexed claims.

What I claim is:

1. In combination with pivotally connected parts, a pivotal connection between said parts comprising a pin connected with one part surrounded by a bushing of soft material such as felt, said bushing being seated in a hole in the other part having an expansion recess or recesses communicating with said hole peripherally, said bushing normally filling the hole but not the expansion recesses whereby the material of said bushing can on occasion expand into said recesses.

2. In combination with pivotally connected parts, a pivotal connection between said parts comprising a pin connected with one part surrounded by a bushing of soft material such as felt, said bushing being seated in a hole in the other part, the wall of said hole comprising ribs extending lengthwise of said hole with recesses between them, said bushing normally filling the hole up to the ribs but not the recesses, whereby the material of said bushing can on occasion expand into said recesses.

3. In combination with pivotally connected parts, a pivotal connection between said parts comprising a pin connected with one part surrounded by a bushing of soft material such as felt, said bushing being seated in a hole in the other part, the wall of said hole comprising space separated ribs, said bushing normally filling the hole up to the ribs but not the spaces between them whereby the material of said bushing can on occasion expand into said spaces.

Signed at Garwood in the county of Union and State of New Jersey this 18th day of May A. D. 1927.

FRED VOLARE.